(No Model.)  W. J. WILLITS  2 Sheets—Sheet 1.
CAR WHEEL.

No. 491,456.  Patented Feb. 7, 1893.

Witnesses  Inventor
W. J. Willits (No Model.) 2 Sheets—Sheet 2.
W. J. WILLITS.
CAR WHEEL.
No. 491,456. Patented Feb. 7, 1893.
Fig. 3.
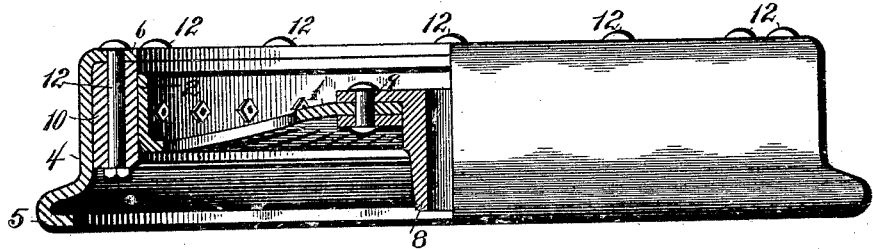
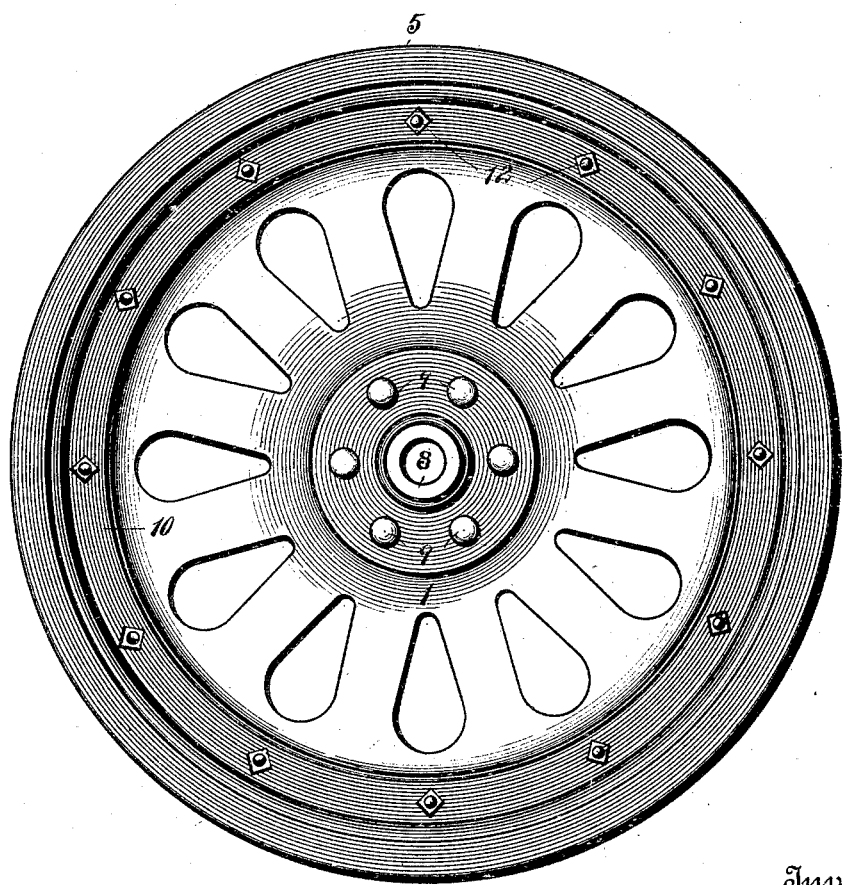
Fig. 4.
Witnesses Inventor
W. J. Willits

UNITED STATES PATENT OFFICE.

WARREN J. WILLITS, OF THREE RIVERS, MICHIGAN.

CAR-WHEEL.

SPECIFICATION forming part of Letters Patent No. 491,456, dated February 7, 1893.

Application filed May 27, 1892. Serial No. 434,648. (No model.)

*To all whom it may concern:*

Be it known that I, WARREN J. WILLITS, of Three Rivers, county of Ingham, and State of Michigan, have invented certain new and useful Improvements in Car-Wheels, of which the following is a specification, reference being had to the accompanying drawings.

The object of my invention is to produce a rolled steel wheel having a suitable support to the points on the tread where the greatest wear occurs.

The advantages of making a car wheel of rolled steel are well understood in the art, but heretofore in making them of a single piece it has been impossible to get a suitable support for the tread where the greatest wear occurs. In making a steel wheel of two pieces, one forming the web, and the other the tire, the difficulty has been to securely and rigidly fasten the one to the other. By my invention I make a wheel of two or more pieces and unite them together so as to secure the advantages of the best known form of wheels, and also those that are desirable on a wheel made of rolled steel.

Figure 1:
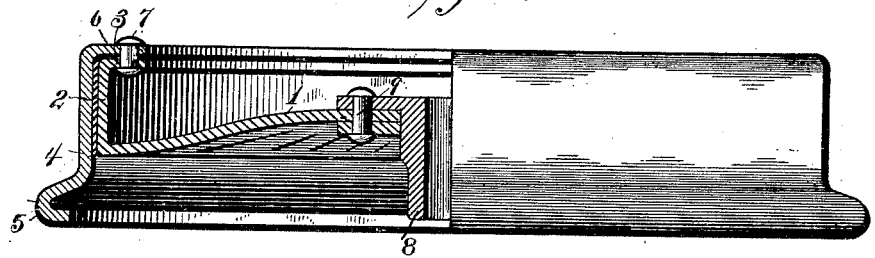
Figure 2:
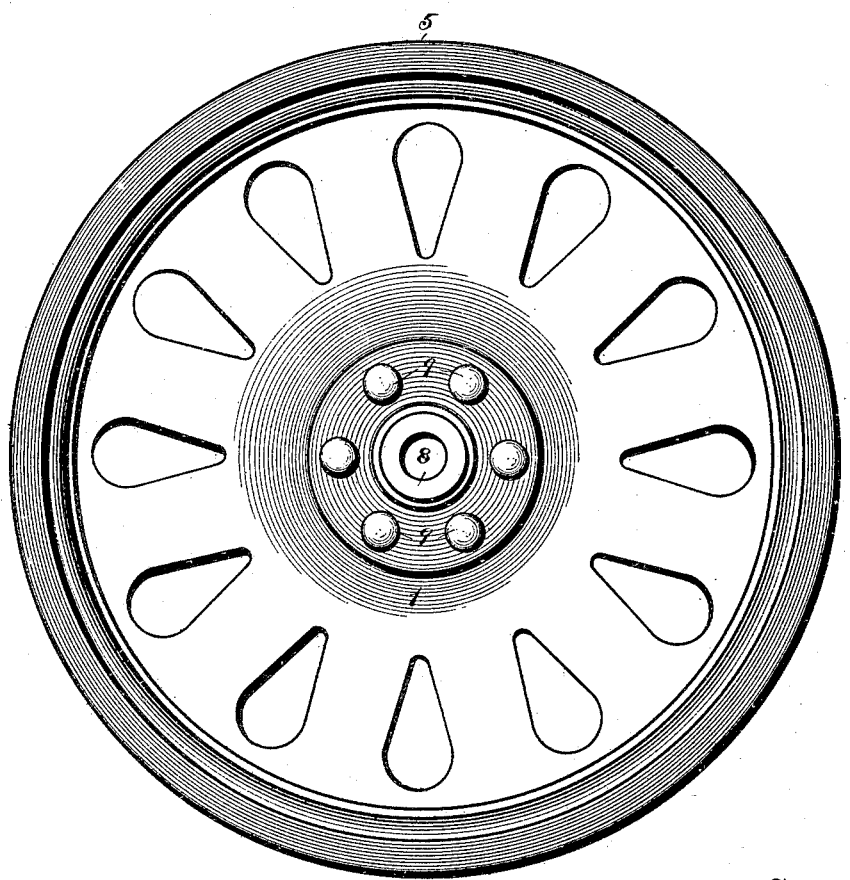

In the accompanying drawings, Figure 1 is a side elevation of one of my wheels showing one-half in cross section; Fig. 2 is a view of one side thereof; Fig. 3 is a view similar to that shown in Fig. 1, of a modified form of my wheel, and Fig. 4 a view of the same, similar to that shown in Fig. 2.

Referring to the figures on the drawings, 1 indicates the inner or main body portion of my wheel, which is preferably made from a circular disk of steel formed in any suitable manner, as for instance by rolling into the shape shown in the drawings, in which 2 indicates an annular flange or web corresponding in relative position to the tread of a wheel, and 3 a returned flange set up at right angles, or nearly so, to the web 2.

4 indicates a tire provided as usual with a rail flange 5, and with a returned or inside annular flange 6. The conformation of the inside of the tire and its returned flange, and that of the web and its returned flange are such that the web and its flange fit snugly within the tire, as illustrated in the drawings.

7 indicates bolts or rivets passed through suitable holes in the returned flanges of the web and tire respectively by which those parts may be securely and rigidly united. The width of the web with respect to that of the tire is such that the inside supporting frame of the wheel is brought opposite to the place on the tread, or outside of the tire, where the greatest wear in use occurs. To the inside of the center of the wheel a hub 8 of any suitable form may be secured in any suitable manner, as for instance by rivets 9.

In place of the returned flange on the web 2, an intermediate piece 10, as illustrated in Figs. 3 and 4 of the drawings, may be employed. That piece preferably consists of a band of wood, strawboard, wood-pulp, paper, indurated fiber, or other similar material bolted to the web by radial bolts 11 and to the returned flange of the tire by transverse bolts 12. This band may serve as a cushion, tending to overcome the sound that is made by an all metal wheel running over a track, or it may be made of insulating material, by which the body of the wheel and its periphery may be separated from each other, as for use in block signal systems, or the like. The same result may be obtained by placing between the tire and the web, as illustrated in Fig. 1 of the drawings, a thin sheet of cushioning or insulating material.

What I claim is:—

1. In a car-wheel, the combination with a tire having an annular flange, of a main body portion having a web and flange corresponding to the inside of the tire and flange, the parts being fastened together through the flanges, substantially as set forth.

2. The combination in a car wheel, of the body having a returned flange at its edge, the tire having an overlapping returned flange at its edge, the intermediate insulating annulus, and the securing bolts, substantially as specified.

3. The combination with a car wheel of the body, having a returned flange at its outer edge, the tire having an overlapping flange, the connecting bolts, and the flanged hub, and bolts by which it is secured to the center of the body, substantially as specified.

4. The combination with a car wheel of the body having a returned flange, the tire having an overlapping returned flange, the intermediate insulating annulus, and confining bolts and flanged hub, secured to the center of the body of the wheel, substantially as specified.

In testimony of all which I have hereunto subscribed my name.

WARREN J. WILLITS.

Witnesses:
LESTER B. PLACE,
A. L. TABER.